US006354407B1

United States Patent
Heinlein et al.

(10) Patent No.: US 6,354,407 B1
(45) Date of Patent: Mar. 12, 2002

(54) RELATING TO DISC BRAKES

(75) Inventors: Carl Edward Heinlein; Philip Leonard Trott, both of Gwent; Jonathan Leslie Christopher Jackson, Ross-on-Wye, all of (GB)

(73) Assignee: Meritor Automotive Inc., Troy, MI (US)

(*) Notice: Subject to any disclaimer, the term of this patent is extended or adjusted under 35 U.S.C. 154(b) by 0 days.

(21) Appl. No.: 09/463,938

(22) PCT Filed: Jul. 31, 1998

(86) PCT No.: PCT/GB98/02300

§ 371 Date: Jun. 5, 2000

§ 102(e) Date: Jun. 5, 2000

(87) PCT Pub. No.: WO99/06725

PCT Pub. Date: Feb. 11, 1999

(30) Foreign Application Priority Data

Aug. 2, 1997 (GB) .............................. 9716363

(51) Int. Cl.[7] .................. F16D 65/56; F16D 65/16; F06J 3/04
(52) U.S. Cl. ............... 188/71.1; 188/72.7; 188/71.8; 188/106 F; 188/72.9
(58) Field of Search ............... 188/72.7, 72.8, 188/72.9, 72.6, 71.9, 196 D, 71.8, 71.1, 106 F, 73.31, 73.45, 370

(56) References Cited

U.S. PATENT DOCUMENTS

| | | | | |
|---|---|---|---|---|
| 4,502,572 A | * | 3/1985 | Davidson et al. | |
| 4,503,947 A | * | 3/1985 | Heidemann et al. | |
| 5,568,845 A | * | 10/1996 | Baumgartner et al. | |
| 5,833,035 A | * | 11/1998 | Severinsson | 188/72.7 |

FOREIGN PATENT DOCUMENTS

| | | | |
|---|---|---|---|
| DE | 3610569 | * | 10/1987 |
| DE | 4032885 | * | 4/1992 |
| EP | 0565997 | * | 10/1993 |
| WO | 9634216 | * | 10/1996 |
| WO | 9722814 | * | 6/1997 |
| WO | 9906725 | * | 2/1999 |

* cited by examiner

Primary Examiner—Douglas C. Butler
(74) Attorney, Agent, or Firm—Carlson, Gaskey & Olds, P.C.

(57) ABSTRACT

A disc brake includes a housing which straddles a braking disc and is slidably mounted in a torque taking member. The housing includes a brake actuator mechanism having at least one adjustable tappet assembly. The tappet assembly extends through a bearing aperture and a cover plate and is sealed thereto by a seal assembly. The bearing aperture is defined by the inside wall of a bearing projection formed with the cover plate. A lever and eccentric arrangement operates the tappet assembly via a force transmission member located in a groove in the eccentric. An intermediate member also located in the groove carries a gear drive which operates an adjuster mechanism for the brake.

33 Claims, 10 Drawing Sheets

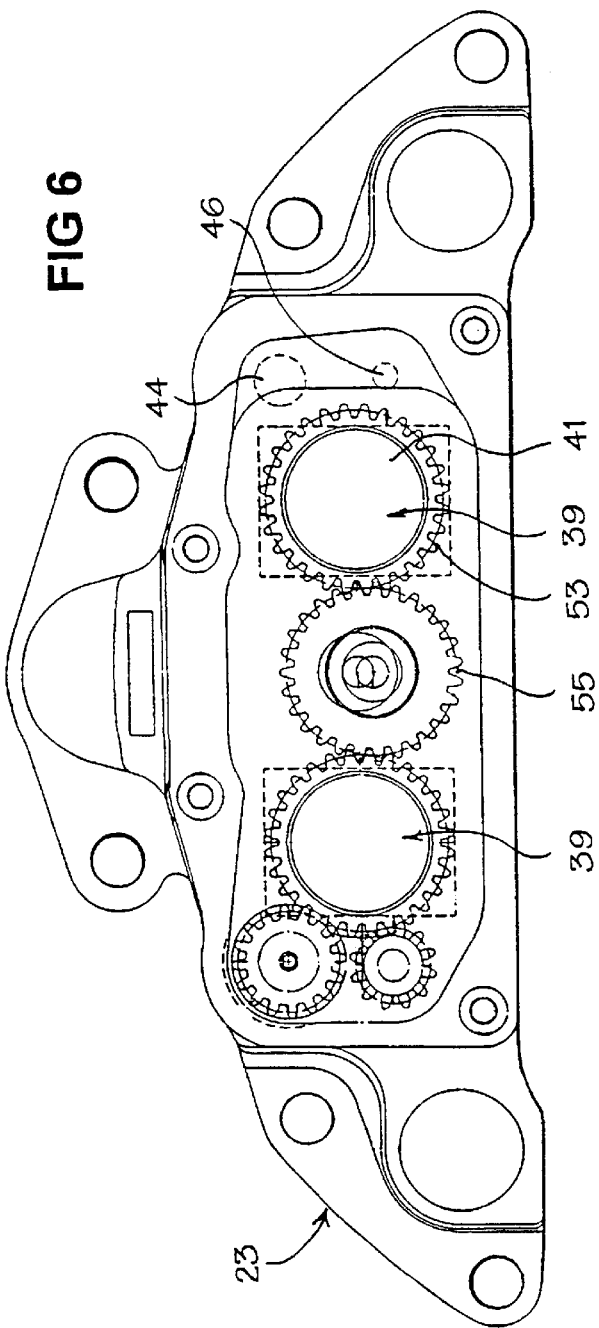
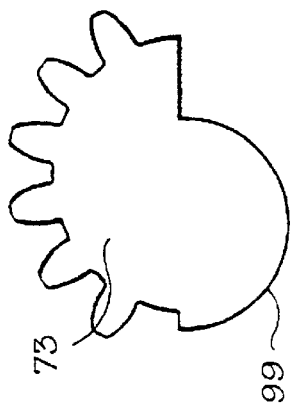
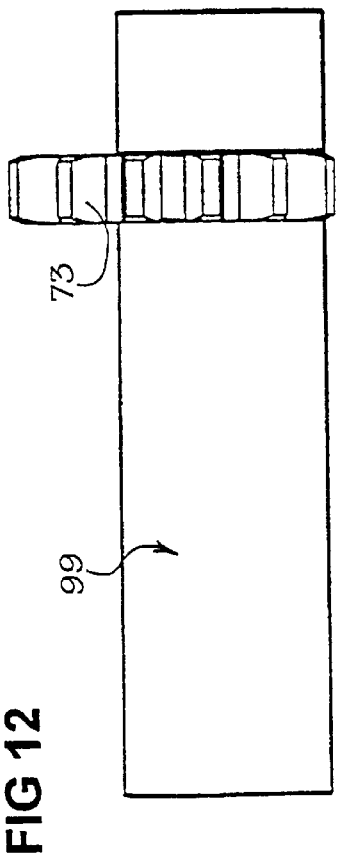

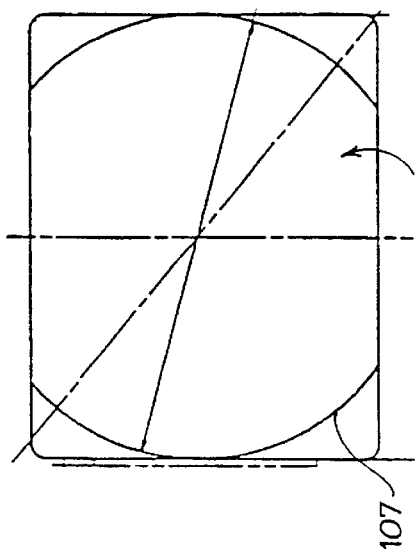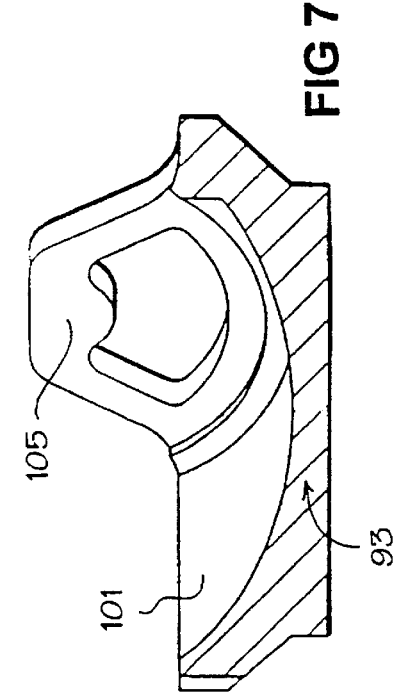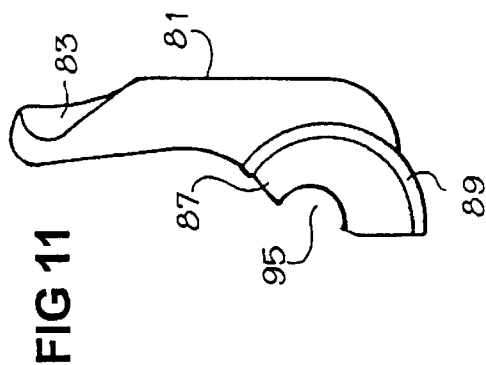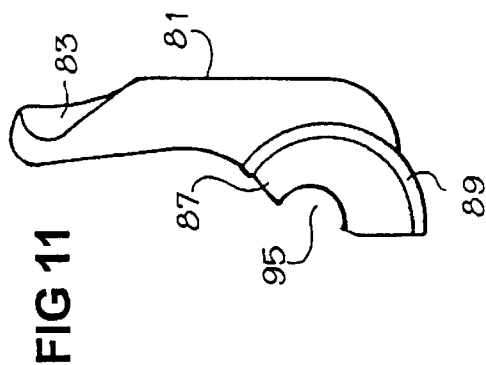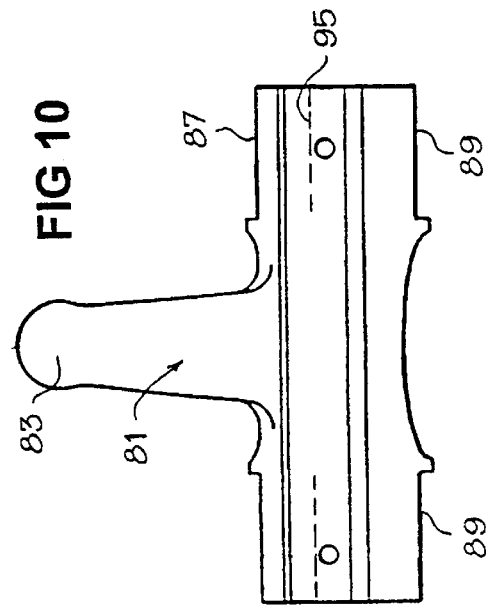

RELATING TO DISC BRAKES

The present invention relates to a disc brake for use on a motor vehicle.

More particularly, the present invention relates to a disc brake which comprises a fixed torque taking or carrier member which straddles a rotatable disc and carries both a directly and an indirectly actuated friction pad assembly. A brake housing overlies the torque taking member and is guided for sliding movement towards and away from the disc by guide pins which are fixed to the torque taking member and which are slidable in openings arranged in the brake housing in a conventional manner. The brake housing comprises a main body portion which contains an actuator mechanism, and a bridge section integral therewith ie. the bridge section is bolted to the main body portion or integrally cast therewith so as to be of unitary construction. The bridge section has an opening arranged radially of the disc, through which the friction pad assemblies can be inserted and removed from the torque taking member.

The present invention relates more specifically to a disc brake wherein the actuator mechanism comprises at least one, but preferably two tappets which are axially movable towards the brake disc to engage and press the directly actuated friction pad assembly against one side of the braking disc, the brake housing reacting and sliding on the said guide pins to apply the indirectly actuated friction pad assembly to the other side of the braking disc. Actuation of the brake is by way of a lever and eccentric arrangement wherein the eccentric arrangement engages the said tappets, pivotal movement of the lever causing the eccentric arrangement to move the tappets towards the braking disc.

In the above described type of disc brake certain problems occur in known constructions and it is the aim of the present invention to seek to overcome these problems to improve performance, life and ease of manufacture.

One such problem relates to the support of the adjustable tappets. In known constructions the adjustable tappets are supported in bearings in the brake housing. However, appreciating that each such tappet is an elongate assembly, it is usual for the bearing length to be less than optimum. As a result and noting the fact that the geometry of the brake actuator is such that the eccentric arrangement which engages the tappets exerts a side load on each of the tappets when the brake is actuated, the tappets will, in certain circumstances, experience side forces such as to cause them to tilt. This tilting may be accentuated by a combination of the tappets extending as a result of lining wear and also as a result of the clearances which exist between the outer wall of the tappet and its respective bearings. Tilting of the tappets may result in unwanted taper wear of the friction pads, and in addition, undesirable wear on the related components of the tappets, supporting bearings and adjacent mechanisms.

The aim of this aspect of the present invention it to produce a new brake design which minimises if not overcomes, the above problem.

According to a first aspect of the present invention there is provided a disc brake comprising a brake housing which, in use, straddles a braking disc and is slidably mounted on a torque taking member, so as to be movable towards and away from the braking disc, the brake housing incorporating a brake actuator mechanism located on one side of the braking disc and arranged to directly engage a friction pad assembly carried by the torque taking member on one side of the braking disc, another friction pad assembly being likewise carried by the torque taking member on the other side of the braking disc, the brake actuator mechanism comprising at least one adjustable tappet assembly which can be engaged with the directly actuated friction pad assembly under the action of a lever and eccentric arrangement, the actuator assembly being located within a recess in the brake housing, which recess is open towards the braking disc, and closed by a cover plate secured to the brake housing, the tappet extending through a bearing aperture in the cover plate, which bearing aperture extends as the inside wall of a cylindrical projection integrally formed with the cover plate, the cylindrical projection extending into the said recess of the brake housing for the major portion of the length of said tappet.

Thus, by virtue of this axially extended bearing the or each tappet is better supported along its length, this improved support resisting tilting of the tappet, and improving actuation efficiency and adjuster control.

In a preferred embodiment the brake comprises two adjustable tappet assemblies, each tappet being basically a two part assembly, one part being a female part which is generally cylindrical with an enlarged diameter head at one end region thereof, this enlarged diameter head engaging, in use, the directly actuated friction pad assembly. Extending from the other end of the said female part, through said female part, is an axially extending blind bore within which one end region of the other part of the tappet assembly ie. the male part, is threadedly engaged, the male part likewise having an enlarged head region which is, in use, engaged and acted upon by the said eccentric arrangement. This enlarged head forms a bearing surface which engages a wall of the axially extending cylindrical projection integrally formed with the cover plate.

Thus, appreciating that the major portion of the outer surface of the female part of each tappet assembly is supported along its length by the inner wall of a said cylindrical projections, thus resisting tilting of the tappet assembly, the engagement of the said bearing surface of the enlarged head of the said male part, with said cylindrical projection further improves tappet support and resists any possibility of tilting under the action of the eccentric arrangement.

Preferably this enlarged head has at its radially outer edge region, an axially extending lip which extends towards the threaded end region of the said male part and forms a cylindrical inner bearing surface which engages around the outer wall formed by the said axially extending cylindrical projection which is integrally formed with the cover plate. Alternatively the free end region of the said cylindrical projection has an enlarged internal diameter section which engages around the outer peripheral bearing surface of the said enlarged head of the said male part.

Whilst the cylindrical projections or extensions of the cover plate may be cast with the cover plate to thus form a unitary construction, the cylindrical extensions may alternatively be at least partially formed by cylindrical bearing sleeves which are secured to the cover plate. Thus the cylindrical bearing sleeves and cover plate may be made from different materials ie. the bearing sleeves may be made of a more suitable and probably more expensive bearing material such as a sintered bearing material and may be cast into the cover plate which can itself be formed as a die casting, thus optimising the construction.

Further, whilst the axially extending lip of the head reigon of the preferred form of said male part of each tappet assembly may be integrally formed with the said male part to thus form a unitary construction, the axially extending lip may alternatively be formed by an appropriately dimensioned hollow cylindrical member in the form of an annulus, which can be secured to the outer surface of the head region of the said male part.

Located between the two tappets is preferably an adjuster mechanism which is preferably secured in position in a further cylindrical projection of the cover plate, which further cylindrical projection is preferably cast with the cover plate to form a unitary construction. This adjuster mechanism incorporates a gear wheel which meshes with teeth provided on the respective heads of the respective male parts of said tappets so that rotation of the gear wheel adjusts both tappets—rotation of the male parts causing the said female parts which are keyed in the cylindrical bearing projections, to move axially through the bearing apertures towards the directly actuated friction pad assembly.

The adjuster mechanism is preferably actuated via gear teeth provided on the lever and eccentric arrangement, a lost motion mechanism being incorporated so that only after sufficient movement of the lever does a further gear wheel with which the gear teeth mesh, cause the first mentioned gear wheel to rotate and the tappets to be adjusted.

The or each said female part may be keyed in a respective cylindrical bearing projection by one or more splines extending axially of the or each said female part and cylindrical bearing projection. The splines may be provided on said female part with complementary grooves being provided in the inner wall of said cylindrical bearing projection. Alternatively the splines could be located in the inner wall of the said cylindrical projection, with the complimentary grooves in the outer wall of said female part.

In an alternative construction, the or each said female part may be keyed in a respective cylindrical bearing projection by the bearing aperture on the or each cylindrical bearing projection having a non-circular/cylindrical transverse cross section and the or each female part having a complimentary transverse cross section outer profile. Preferably the bearing apertures and outer profile of the female parts are trilobal to prevent the female parts from rotating in the respective said bearing apertures.

This trilobal construction is considered to be easier to manufacture than a splined arrangement as it can be formed by a simple forging process on the said female part. Also if the bearing projection is formed by a cylindrical bearing sleeve secured to the cover plate, the trilobal internal configuration is easily formed with the sleeve being manufactured by way of sintering and therefore requiring a minimum amount of finishing.

Further, in a two tappet construction the tendency for the tappets to bind and/or tilt in the bearing apertures as formed by the bearing projections, as the brake experiences torque during brake applications, is minimised if the trilobal cross sections are arranged in the same orientation with the apex of one lobe of each trilobal cross section being directed towards the centre of rotation of the brake disc.

If desired, the cover plate can incorporate other cylindrical, or other configuration, projections incorporating appropriately dimensioned spigots or recesses within which various ancillary brake mechanisms eg. a pad wear sensor and/or manual retraction mechanism, can be located, and for ease of manufacture and assembly of the brake such cover plate spigots and recesses can be produced in mirror image duplication so that irrespective of the way the cover plate is initially installed, appropriate locating spigots and/or recesses will always be provided.

A further problem arises with the basic construction of the present invention with regard to the provision of appropriate bearings within the brake housing to support part cylindrical regions of the lever and eccentric arrangement.

To explain, current brake designs which use a lever and eccentric as a method of applying the brake require the cylindrical surfaces of the eccentric to be rotatably arranged in a semi-cylindrical roller bearing. A bearing cage is in these prior constructions, seated in a complimentary profiled form machined in the cover plate. However, in these brakes the cover plate is mounted on the rear of the brake housing ie. away from the braking disc, and as the cover plate is a separate component this presents easy access for tooling for forming the relevant machined surfaces to seat the semi-cylindrical bearings, though it is an expensive and slow operation.

With the brake design of the present invention wherein the recess in the brake housing, which houses the actuator mechanism, opens towards the brake disc, problems occur with regard to machining of the required bearing seats. To overcome this problem it is of course always possible to provide a further outer cover plate which can be machined as per prior art constructions. However this adds to the cost of the construction. Further, a lateral opening could be provided in the brake housing wall to permit access of a suitable machining tool. However, whilst it still may be practical to produce the required surfaces in this way, we are then faced with the problem of suitably sealing the opening once the brake is assembled. Again this adds to the cost of the construction.

The aim of this further aspect of the present invention is therefore to provide a disc brake construction of the type which the present invention relates, with appropriate bearing surfaces for the eccentric arrangement.

According to a further aspect of the present invention there is provided a disc brake comprising a torque taking member which, in use, straddles a braking disc, a brake housing being slidably mounted on the torque taking member so as to be movable towards and away from the braking disc, the brake housing having a main body portion with a recess in which an actuator mechanism operable by a lever and eccentric arrangement, is mounted, the recess opening towards the braking disc and being provided with bearing seat members which are located in further respective recesses provided in a wall of the said recess of the brake housing, each bearing seat member incorporating a part cylindrical bearing surface on which a bearing forming part of the lever and eccentric arrangement can engage.

Preferably each bearing seat member is provided with a retaining projection at one end of the part cylindrical bearing surface, this retaining projection, in use, extending over an end of a groove provided in the lever and eccentric arrangement to axially retain a cylindrical force transmitting member which is arranged in said groove.

Further, the two bearing seat members are each preferably located in said further recesses so as to be freely rotatable therein about an axis perpendicular to the base of each recess. Thus, on assembly the bearing seat members can be loosely located in said further recesses with the bearing seat members being automatically correctly aligned with each other as and when the lever and eccentric arrangement is located thereon. Alternatively, the bearing seat members may be of suitable design eg. tapered base regions, to locate in suitably designed further recesses in the brake housing recess, with initial operation of the brake applying pressure to each bearing seat member via the lever and eccentric arrangement, and causing deformation of the base regions and/or further recesses, to thus provide for a secure positive location of the bearing seat members in the brake housing, correctly aligned with each other.

Further, by manufacturing the bearing seat members as separate components from the brake housing, a more suitable material for the bearing seat members can be selected without the need to make the whole brake housing of the same material. Thus the cost of construction can be minimized without any reduction in performance characteristics.

According to a further aspect of the present invention there is provided a disc brake comprising a brake housing, which straddles a braking disc and is slidably mounted on a torque taking member which carries a directly actuated and an indirectly actuated friction pad assembly located on opposite side faces of the braking disc, the brake housing being slidable towards and away from the braking disc under the action of an actuator mechanism which is housed in part of the brake housing on one side of the braking disc, the actuator mechanism comprising a pair of tappets which can engage against the directly actuatable friction pad assembly, said tappets being axially slidable towards the braking disc by a lever and eccentric arrangement, one end region of the lever having two lateral extensions, each extension forming a part cylindrical bearing surface which is supported on a bearing seat within the brake housing, a groove extending transversely of the lever between the said lateral projections, said groove being eccentric relative to said part cylindrical bearing surfaces and housing a force transmitting member towards each end region thereof, each force transmitting member engaging a respective tappet, an intermediate member located in the groove between said two force transmitting members serving to correctly position said force transmitting members with respect to the tappets and carrying a gear drive which engages with an adjuster mechanism which can operate to adjust the length of the tappets as necessary.

Preferably the groove is of part cylindrical configuration with the force transmission members being cylindrical members, the intermediate member being likewise cylindrical with the gear drive projecting laterally from the outer surface thereof. The groove may be semi-circular in transverse cross section or less than a semi-circle in transverse cross section, in which case the force transmitting members and the intermediate member can merely be located laterally within the groove during installation. Alternatively, if the groove is larger than a semi-circle, the various members have to be axially slid into the groove.

Whilst the force transmitting members are rotatable within the groove and are axially retained in position preferably by the intermediate member and the retaining projection of each bearing seat member as described hereabove, the intermediate member is preferably fixed in the groove against rotation and/or axial movement by the surface of the lever adjacent the groove being staked ie. deformed, at spaced locations along the axial length of the groove. Alternatively, the intermediate member may be axially retained in the groove, eg. by the force transmitting members, though rotatable therein to a limited extent, the rotational limit being defined by the gear drive engaging the sides of the groove, this limited rotation possibly providing for the required lost motion in the adjuster mechanism.

The lever and lateral extensions are preferably cast with the groove required to locate the force transmitting members and intermediate member, being machined in one operation. Whilst the lever and lateral extensions are preferably manufactured from cast steel, the intermediate member could, if desired, be manufactured from any other suitable metal, eg. even a plastics type of material.

The above construction provides an improved weight reduced lever and eccentric arrangement which is easy to manufacture and arranged to advantageously provide a drive mechanism to the adjuster mechanism.

According to a still further aspect of the present invention there is provided a disc brake comprising a torque taking member which straddles a braking, disc, with a brake housing being slidably mounted on the torque taking member for movement parallel to the axis of the rotatable braking disc, the brake housing, incorporating a brake actuator mechanism located on one side of the braking disc, the disc brake actuator mechanism incorporating at least one tappet assembly which is axially slidable within a bearing, aperture, the tappet assembly having an enlarged head region which can engage on brake actuation, a directly actuated friction pad assembly carried by the torque taking member on one side of the braking disc, an indirectly actuatable friction pad assembly being likewise carried by the torque taking member on the opposite side of the braking disc, a seal assembly in the form of an annular construction being secured between the brake housing, the head of the tappet and a shaft of the tappet, the annular seal assembly comprising a flexible annular boot member, one end region of which is secured in a groove in the head region of the tappet, the other end region being located between a surface of the brake housing adjacent to the bearing aperture and part of a general cylindrical retaining section which is engaged securely within an enlarged diameter end region of the bearing aperture, an annular lip seal secured to the retaining member, projecting inwardly of the bearing aperture and engaging against the said shaft of the tappet.

The above still further aspect of the present invention provides a double tappet seal which is positively secured to the brake housing and which is relatively easy to instal. In a preferred construction of the seal assembly the annular lip seal is secured eg. bonded, coaxially with the annular retaining member which is preferably made of metal. The combined lip seal and retaining member are, during construction of the brake, fitted into an enlarged end region of the bearing aperture, prior to the tappet being inserted in the bearing aperture. The retaining member being an interference fit in the enlarged end region of the bearing aperture. Then the tappet with the flexible boot member secured to the head region of the tappet, is inserted through the lip seal and thus the bearing aperture, the flexible boot member then being secured between the retaining member and an adjacent surface of the brake housing.

In an alternative embodiment wherein the flexible boot member is also secured to the retaining member so that the boot member, lip seal and retaining member form a unitary construction, the flexible boot member is secured to the head region of the tappet with the lip seal located on the tappet shaft, prior to installation of the tappet in the bearing aperture. On insertion of the tappet into the bearing aperture the retaining member can be pressed into the enlarged end region of the bearing aperture as an interference fit, securing the lip seal in the desired position relative to the tappet shaft wall as well as retaining the flexible boot in the desired position.

The above individual aspects of the construction of the present invention improve the performance characteristics and ease of manufacture and can be adopted in combination with each other or individually as desired.

The present invention will now be further described, by way of example, with reference to the accompanying drawings, in which:

FIG. 6 is a view of the brake with the cover plate removed, illustrating the mirror image duplication of available recesses;

FIG. 7 is a perspective, partially cut-away view of a bearing seat member according to a further aspect of the present invention;

FIG. 8 is an inverted plan view of the bearing seat member of FIG. 7;

FIG. 9 is a rear view of a lever arrangement as utilised in the embodiments of FIGS. 1, 2 and 3;

FIG. 10 is a front view of the lever in FIG. 9;

FIG. 11 is a side view of the lever of FIGS. 9 and 10;

FIG. 12 is a plan view of the intermediate member used with the lever of FIGS. 9 to 11;

FIG. 13 is an end view of the intermediate member of FIG. 12; and

Figure 1:
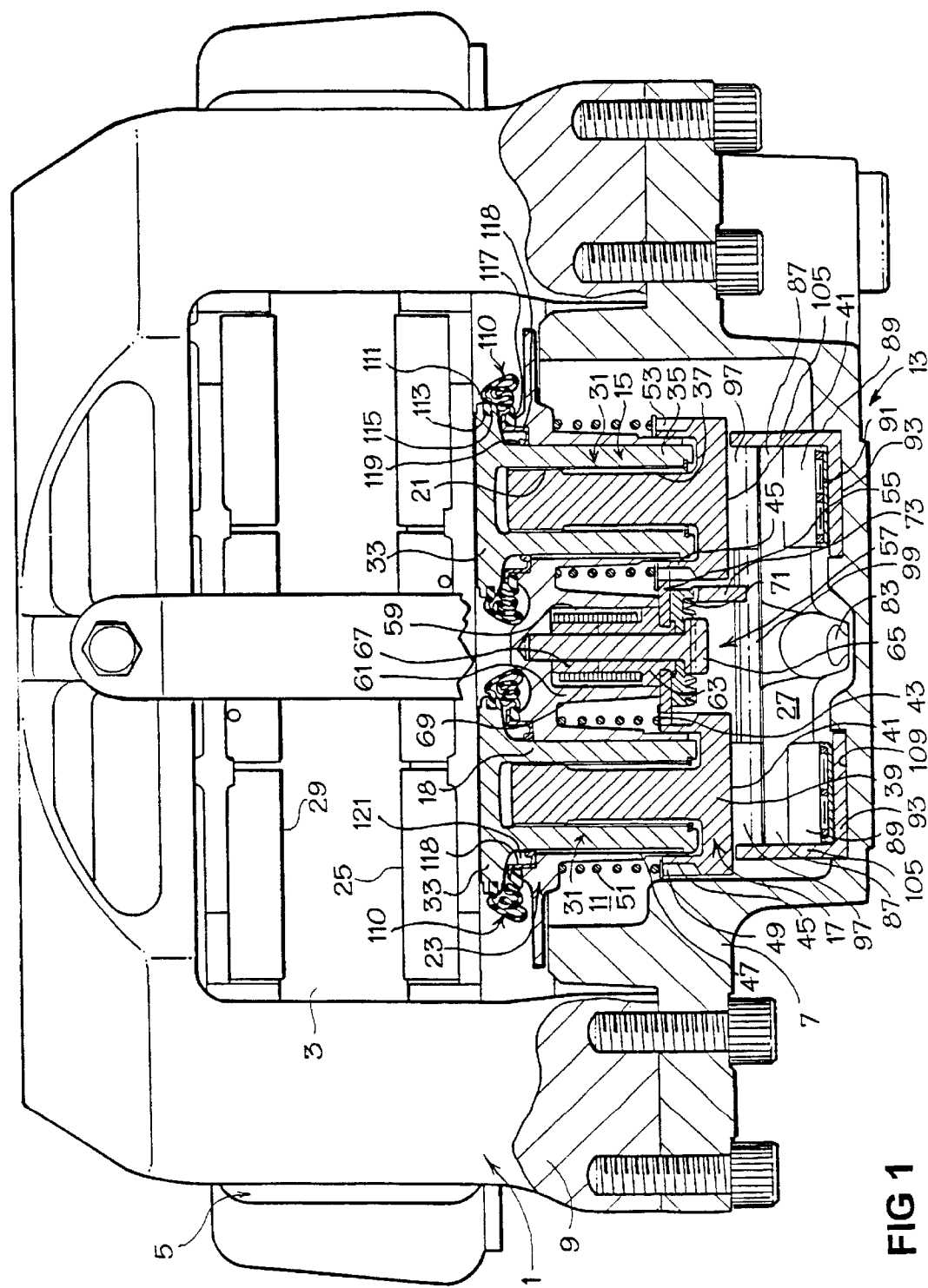
FIG. 1 is a partially cut-away view of one embodiment of a disc brake constructed according to the present invention.
Figure 1A:
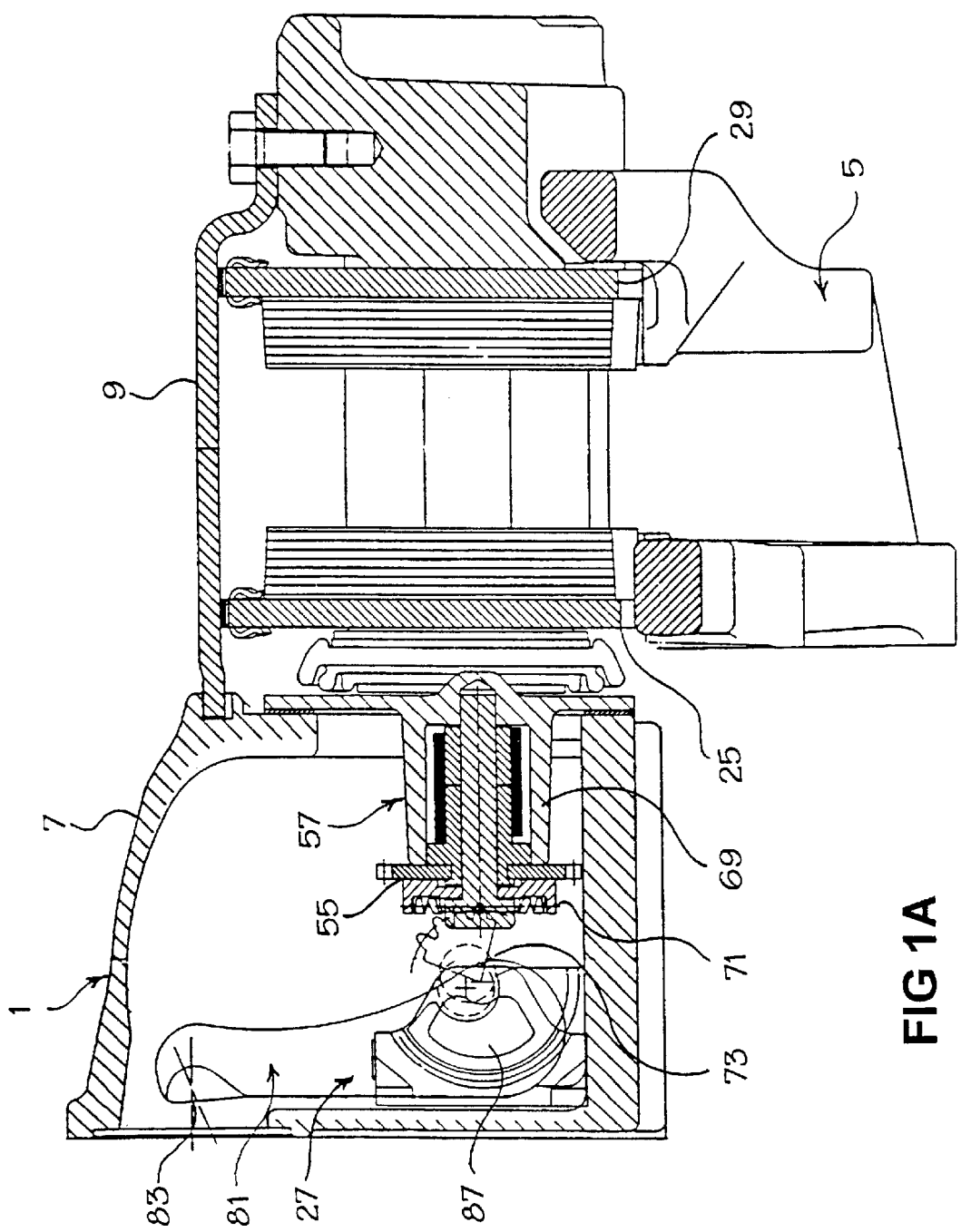
FIG. 1A is a cross sectional view of the brake shown in FIG. 1.

Referring to the embodiment of the present invention illustrated in FIGS. 1 and 1A of the accompanying drawings, the brake basically comprises a brake housing generally designated 1, which straddles a braking disc 3 and is slidably mounted on a torque taking member 5 by virtue of guide pins (not illustrated) in a conventional manner.

The brake housing 1 comprises a main body section 7 which is bolted to a bridge section 9. Alternatively, the main body section and the bridge section can be integrally cast as a unitary construction, the main body section having a cavity or recess 11 within which a brake actuator mechanism generally designated 13 is located, the cavity or recess in the brake housing being open towards the braking disc 3 to allow for the location of the actuator mechanism 13 during manufacture and assembly.

The actuator mechanism 13 comprises a pair of tappet assemblies 15, 17 which are parallel to each other and which extend through bearing apertures 19, 21 provided in a cover plate 23 which is secured to the brake housing 1 and which closes off the said cavity/recess 11, each tappet assembly 15, 17 being engageable with a directly actuated friction pad assembly 25 under the action of a lever and eccentric arrangement 27. Pivotal movement of the lever 27 causes the tappet assemblies 15,17 to move towards the braking disc 3 to engage the directly actuatable friction pad assembly 25 and press this friction pad assembly 25 against one side of the braking disc 3. Continued pressure causes the brake housing 1 to slide on the guide pins relative to the torque taking member 5 and braking disc 3, with the bridge section 9 pressing on an indirectly actuatable friction pad assembly 29 which engages the opposite side of the braking disc 3.

Each tappet assembly 15, 17 comprises an elongate female part 31 which has an enlarged head region 33 which can engage or act upon the directly actuatable friction pad assembly 25. The other end region 35 of said female part 31 has a blind bore 37 which extends axially through the said female part 31. Threadedly interengaged in said blind bore 37 is a male part 39 of each tappet assembly 15, 17, the outer end region of said male part 39 being formed with an enlarged head region 41 on which the lever and eccentric arrangement 27 acts.

As evident in FIG. 1 of the accompanying drawings the cover plate 23 is provided with a cylindrical extension 43 projecting perpendicularly therefrom and into the cavity 11 of the brake housing 1, the inner wall of this cylindrical extension 43 forming a supporting bearing surface for the outer wall of the female part 31 of each tappet assembly 15, 17, the cylindrical extension 43 supporting said female part 31 for the majority of its length and thus limiting, if not preventing, tilting of the female part 31 of the tappet assembly 15,17 in its bearing support.

Further, the enlarged head region 41 of the male part 39 of each tappet assembly 15,17 has a cylindrical lip extension 45 which extends in the same direction as the threaded shaft of the male part 39, this cylindrical lip 45 engaging and being carried upon the outer surface of the cylindrical extension 43 of the cover plate 23. Thus the cylindrical head 41 of the male part 39 of each tappet assembly 15, 17 is positively carried by the cylindrical extension 43 of the cover plate 23, thereby resisting any side forces which may be applied by virtue of the lever and eccentric 27 and limiting, if not preventing, any tilting of the tappet assemblies 15, 17 with the resultant advantageous removal or minimising of tapered wear on the friction pad assemblies 25, 29, and improving brake and adjuster efficiency.

As seen in FIG. 1 of the accompanying drawings, the female part 31 of each tappet assembly 15, 17 is keyed as at 47 for solely axial movement within the cylindrical projection 43 of the cover plate 23, rotation of the male part 39 of each tappet assembly 15,17 thus solely causing axial movement of the female part 31 thereof.

Further, the cylindrical lip 45 carries an annular washer 49 against which one end of a coiled spring 51 engages, the other end engaging the cover plate 23. This spring 51 thus presses the male part 39 of each tappet assembly 15, 17 against the lever and eccentric arrangement 27.

To produce axial adjustment of each tappet assembly 15, 17 rotation of the male part 39 is required and this is effected via teeth 53 provided on the outer surface of the cylindrical lip 45, a gear wheel 55 of an adjuster mechanism 57 engaging the teeth 53 on the respective male parts 39 of the respective tappet assemblies 15, 17.

The adjuster mechanism 57 is likewise carried in a recess 59 defined by a cylindrical projection 61 of the cover plate 23, this cylindrical support 61 positively retaining and securing the position of the adjuster mechanism 57 within the brake housing 1, and thereby ensuring improved positioning with respect to the male part 39.

Additionally, further recessed projections (see FIG. 6) can be provided ie. cast in the cover plate 23, to facilitate positive retention and positioning of various mechanisms eg. a pad wear sensor mechanism. Preferably, such recessed projections are provided in a mirror image duplication (see ghosted circles 44,46 in FIG. 4) so that during assembly of the brake the cover plate 23 will readily fit all of the desired features whichever way it is located.

The adjuster mechanism 57 comprises the gear wheel 55 which is fixedly mounted on core part 63 which is freely rotatably mounted on rotatable shaft 65, a further cylindrical core part 67 being fixed on said shaft 65 against rotation relative thereto, with a wrap spring 69 engaging the outer surfaces of said core parts 63, 67. Further, to facilitate rotation of said shaft 65, a gear wheel 71 with axially extending teeth on its perimeter is secured on said shaft 65 with a degree of rotational clearance between the gear wheel 71 and the shaft 65 defining the normal brake slack, said axially extending teeth meshing with a gear drive 73 forming part of the lever and eccentric arrangement 27. Thus, pivotal movement of the lever and eccentric arrangement 27 causes the gear drive 73 to take up clearance with the axially extending teeth of the gear wheel 71, sufficient pad wear resulting in the gear drive 73 being rotated far enough to rotate the gear wheel 71 and rotatable shaft 65, causing the wrap spring 69 in this direction of rotation, to secure the two core parts 63,67 together, resulting in the gear wheel 55 rotating the male parts 39 of the respective tappet assemblies 15, 17 with the female parts 31 thus moving axially relative thereto to adjust the length of the respective tappet assemblies to take account of pad wear, return motion of the lever and eccentric arrangement 27 being released from the respective tappet assemblies via the wrap spring 69 which provides a lower drag torque between the core parts 63, 67 in the reverse direction of rotation.

Figure 1B:
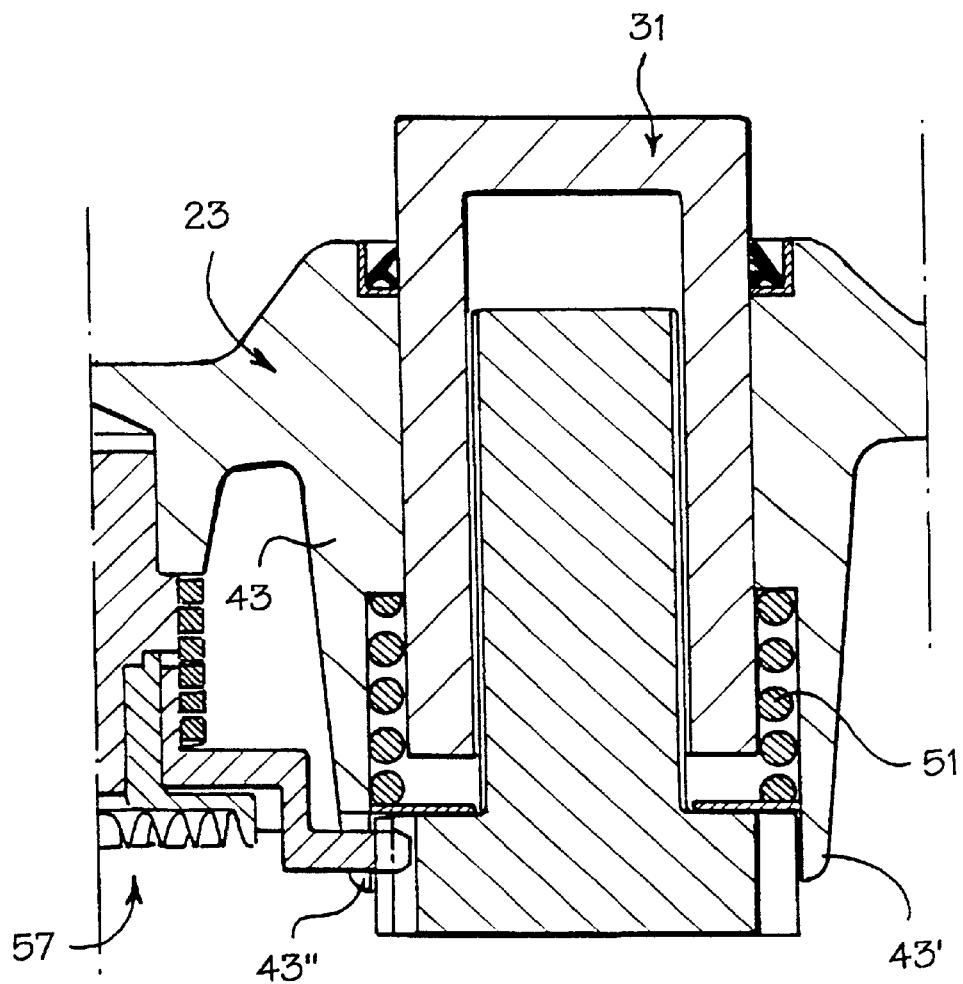
FIG. 1B is a cross-sectional view of part of a modified embodiment of the present invention.

In a modified form of the disc brake constructed according to the present invention and shown in FIG. 1B, wherein the reference numerals used in FIG. 1 are again used to indicate equivalent parts, the free end region 43' of each cylindrical projection 43 has an enlarged internal diameter within which the enlarged diameter head region 41 of the male part 39 of a tappet 15,17 engages, the inside wall of said free end region 43' thus supporting the male part of the tappet. This enlarged head region 41 is provided with the teeth 53 which mesh with the adjuster mechanism via an opening 43" in the wall of the said free end region, the spring 51 being likewise within the cylindrical projection between the enlarged head region 41 and a shoulder formed by the stepped bore in the cylindrical projection 43.

Figure 2:
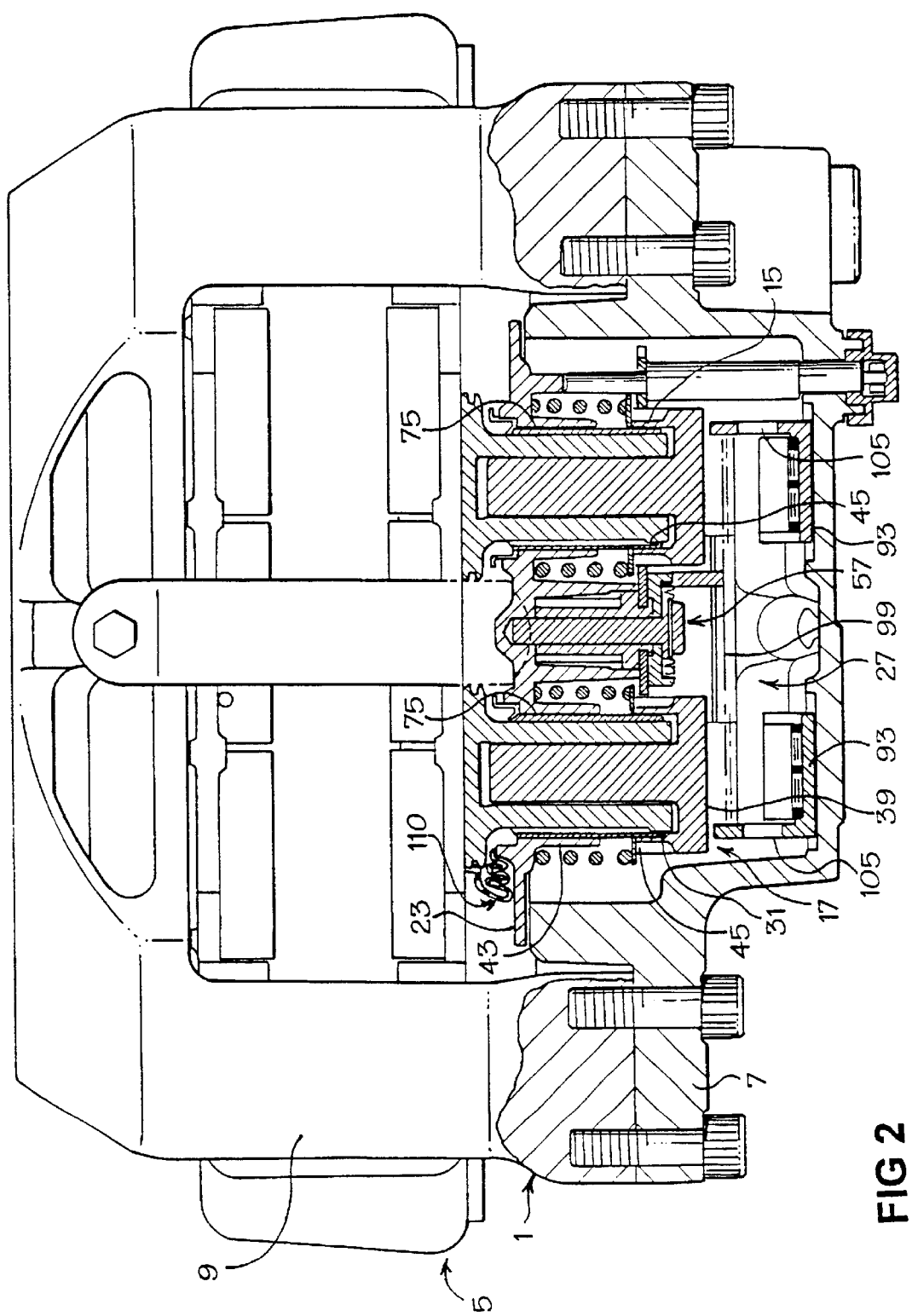
FIG. 2 is a partially cut-away view of a further embodiment of a disc brake constructed according to the present invention.

In a further modified form of the disc brake of the present invention as shown in FIG. 2 of the accompanying drawings, wherein the reference numerals used in FIG. 1 are again used to indicate equivalent parts, the said cylindrical extensions 43 of the cover plate 23 are reduced in axial length as compared to those of the FIG. 1 construction, with a bearing cylindrical liner 75 being secured therein and extending for the major part of the length of the female part 31 of each tappet assembly 15,17, the cylindrical lip 45 of the male part 39 of each tappet assembly 15, 17 engaging over the free end region of the respective bearing liners 75. By this construction, the bearing liner 75 can be made of a more suitable, usually more expensive bearing material as opposed to the usual cast material construction of the cover plate 23, thereby minimising the cost of construction.

Figure 3:
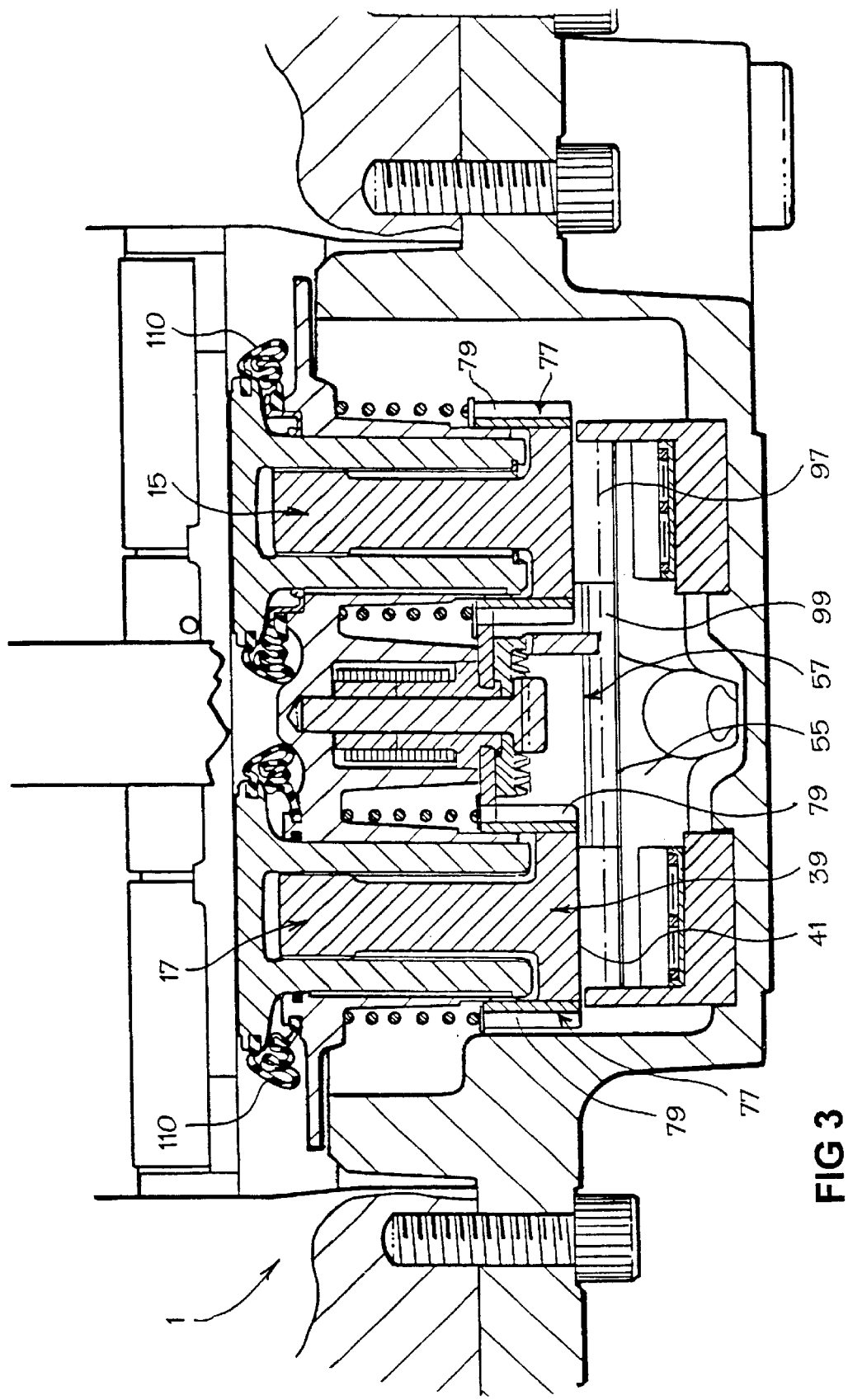
FIG. 3 is a partially cut-away view of a still further embodiment of a disc brake constructed according to the present invention.

In a still further embodiment of the present invention, as illustrated in FIG. 3 of the accompanying drawings, wherein the reference numerals used in FIG. 1 are again used to indicate equivalent parts, whilst the cylindrical extensions 43 of the cover plate 23 are as provided in the embodiment of FIG. 1, the cylindrical lip 45 on the enlarged head region 41 of the male part 39 of the respective tappet assemblies 15, 17, is formed by an annular member 77 which is secured around the enlarged head region 41 of each male part 39, this annular member 77 forming the required cylindrical lip which engages over the cylindrical extension 43 of the cover plate 23 to support the male part 39 of each tappet assembly 15,17, the outer surface of each annular member 77 being provided with appropriate teeth 79 which mesh with the gear wheel 55 of the adjuster mechanism 57. This modified construction can provide advantages in manufacture particularly with the choice of materials bearing in mind wear etc. with regard to the meshing of the teeth 79 with the gear wheel 55 of the adjuster mechanism 57.

Figure 4:
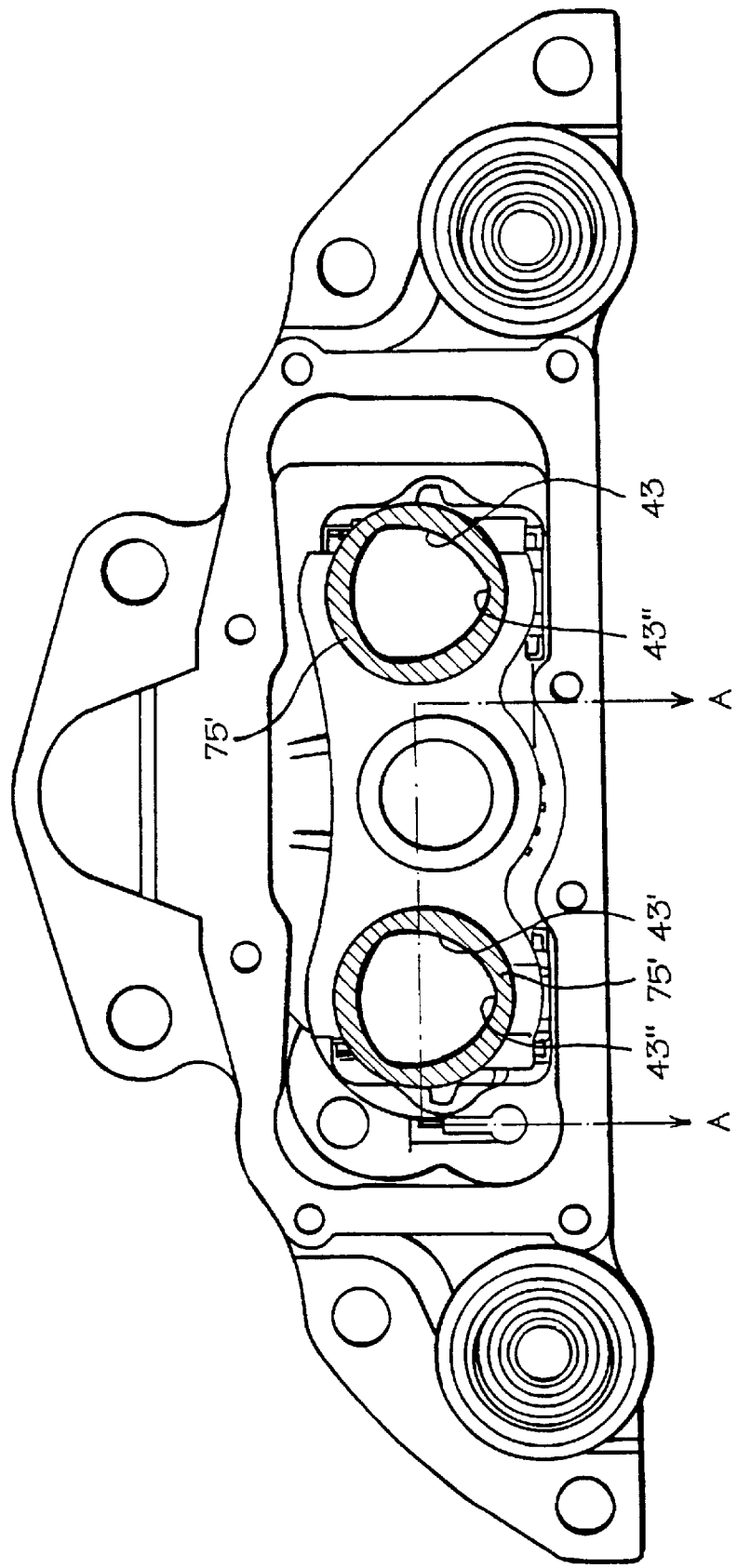
FIG. 4 is a cross sectional view of part of a still further modified embodiment of the present invention.
Figure 5:
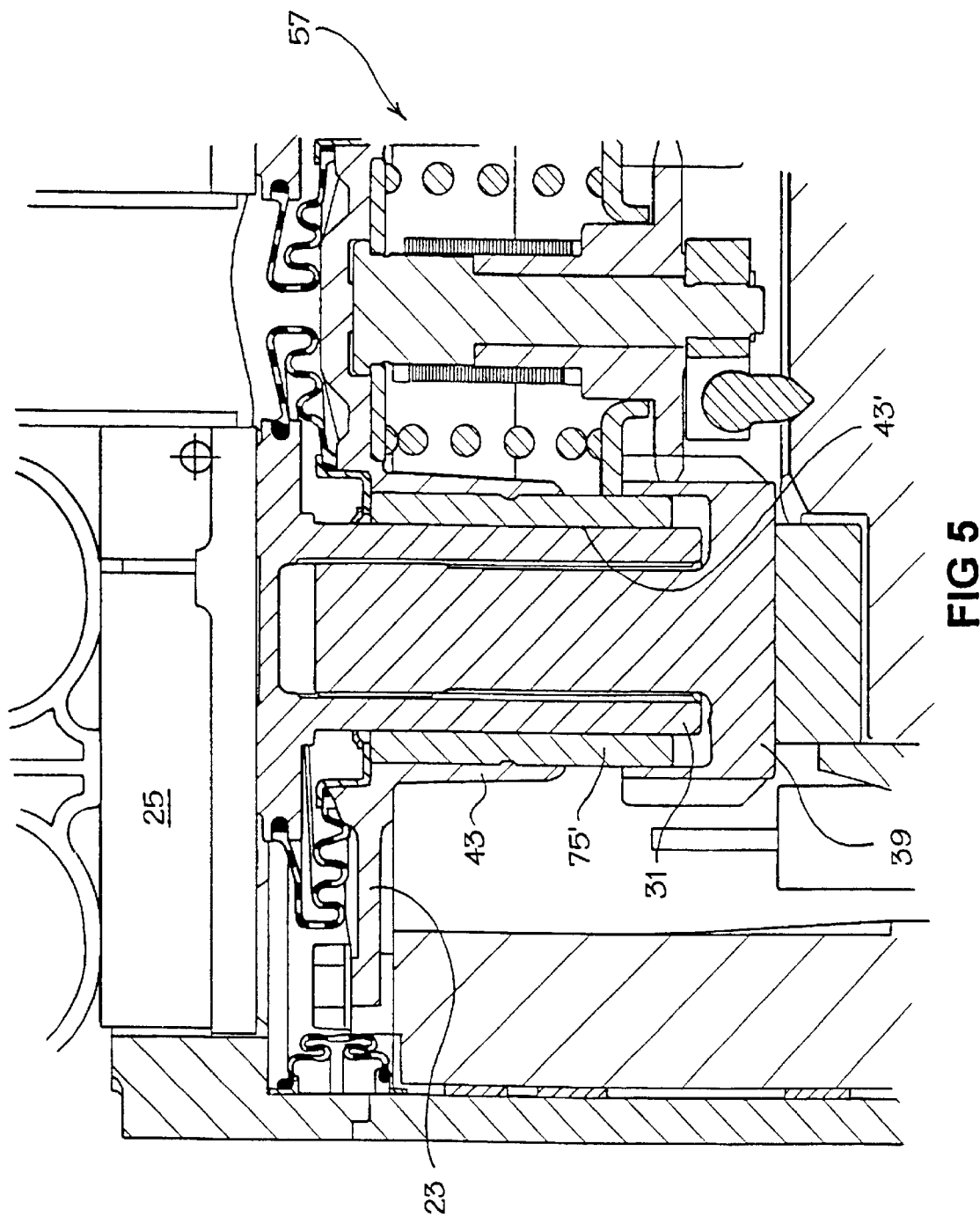
FIG. 5 is a cross sectional view taken along line A—A in FIG. 4.

Whilst the male and female parts 31, 39 in each of the embodiments of FIGS. 1, 2 and 3 of the accompanying drawings are keyed together by an axially extending spline/groove (see 47 in FIG. 1), FIGS. 4 and 5 of the accompanying drawings show a modified form of the present invention wherein the female part 31 of each tappet assembly 15, 17 is keyed for solely axial movement within the bearing projection 43 of the cover plate 23, by the outer profile of the transverse cross section of the female part 31 being trilobal and being located in a complimentary trilobal transverse cross section bearing aperture 43' in the bearing projection 43 of the cover plate 23. Thus the female part 31 is an axially slidable fit on the bearing aperture 43' but cannot be rotated relative thereto, rotation of the axially secure male part 39 thereby causing axial movement of the female part in the bearing aperture 43'.

Further the trilobal cross sections of the two tappet arrangements 15, 17 are arranged in the same orientation with the apex 43" of one lobe of each trilobal cross section being directed towards the centre of rotation of the brake disc 3 as shown in FIG. 4 of the accompanying drawings. By this construction the tendency for the tappets 15, 17 to bind and/or tilt in the bearing apertures 43', as the brake experiences torque during brake applications, is minimised.

This trilobal construction is considered easier to manufacture than, for example, a splined arrangement such as shown at 47 in FIG. 1, as it can be formed by a simple forging process on said female part 31. Also if the bearing aperture 43' is formed by a bearing sleeve 75' secured to the cover plate 23, as shown in FIGS. 4 and 5, the trilobal construction is easily formed with the sleeve 75' being manufactured by way of sintering and therefore requiring a minimum amount of finishing. If desired, the sintered bearing 75' may be cast into the die cast cover plate 23.

With regard to the lever and eccentric arrangement 27 in each of the embodiments of FIGS. 1, 2 and 3 of the accompanying drawings as best seen in FIGS. 9 to 13, this comprises an elongate lever 81, one upper end region 83 of the lever 81 being engageable by actuating means such as a pneumatic actuator, whilst the other, lower end region 85 has two opposite directed lateral extensions 87 which effectively form an operational bearing shaft. To explain, opposite end regions of this operational bearing shaft are formed with part cylindrical bearing surfaces 89 which, in use, are supported on bearings 91 carried on like curvature bearing seat members 93 located in the brake housing 1, as described hereinbelow.

Eccentric to the centre of curvature of the respective curved bearing surfaces 89 of the operational bearing shaft, and generally opposite to said bearing surfaces is an elongate groove 95 which is machined along the length of said operational bearing shaft. This groove 95 has a part cylindrical configuration which is less than semi-circular in transverse cross section. Alternatively, if desired, the groove 95 may have a transverse cross section which is larger than a semi-circle. Cylindrical force transmitting members 97 which are of a complimentary diametrical dimension to the said groove 95, are located at opposite end regions of the groove 95 with an intermediate member 99 located therebetween, the intermediate member 99 preventing axial movement of the force transmitting members 97 towards each other. The gear drive 73 previously referred to is a lateral extension of this intermediate member 99 and the intermediate member 99 is secured against rotation or axial movement in the groove 95 by adjacent regions of the operational bearing shaft being deformed ie. staked, adjacent to the edge of the groove 95. Alternatively, the intermediate member 99 may be allowed to rotate to a limited degree, rotation being limited by the lateral gear drive 73 engaging the edges of the groove 95, this limited rotation providing for the required lost motion in the adjuster mechanism 57 to which the gear drive 73 is meshed.

Whilst the intermediate member 99 is made of cast steel it may alternatively, if desired, be made of any suitable other metallic material or even a plastics material.

As referred to hereabove the curved bearing surfaces 89 at opposite end regions of the operational bearing shaft are supported on bearings 91 which are mounted on complimentarily curved surfaces 101 in bearing seat members 93 which are themselves located in appropriate recesses 109 in the bottom face of the cavity 11 in the brake housing 1. These bearing seat members 93 are best illustrated in FIGS. 7 and 8 wherein it will be seen that each bearing seat member 93 presents a curved bearing support surface 101, at one end of which is provided a retaining section 105. As evident from FIGS. 1, 2 and 3, these retaining sections 105 extend over the ends of the groove 95 in the operational bearing shaft to hold the force transmitting members 97 in the respective end regions of the said groove 95.

As shown in FIG. 8 the base 107 of each bearing seat member 93 is generally of circular/cylindrical configuration and is freely rotatably located in a complimentary recess 109 in the base of the cavity 11. Thus, during installation, when the bearing operational shaft and bearings 91 are located on the respective bearing seat members 93, the bearing seat members 93 rotate in their respective recesses 109 to become accurately and correctly aligned with each other for subsequent use.

In a modified form of construction, the base of each bearing seat member 93 is shaped eg. tapered, so as to overly the edges of the recesses 109 in the base of the cavity 11 in the brake housing 1. Thus, whilst the respective bearing seat members 93 can be generally located in position, when the lever and eccentric arrangement 27 is located on the respective bearing seat members 93, the bearing seat members 93 rotate to correctly and accurately align with each other, and then on initial use of the brake, the bearing seat members 93 are deformed into the respective recesses 109 to firmly and positively secure the bearing seat members 93 as an integral part of the brake housing 1. Alternative possible shapes and configurations are of course possible for the bearing seat members 93 and the recesses 109 to provide for this positive and secure attachment of the bearing seat members 93 to the brake housing 1.

Further these bearing seat members 93 facilitate manufacture as it would be difficult to machine appropriate bearing support surfaces 101 in the base region of the cavity 11 in the brake housing 1 without the provision of an outer cover plate, or a lateral opening which would then require to be sealed. Also, by the provision of separate components as bearing seat members 93, a more suitable material can be selected for the construction of the bearing seat members 93 without the need for the whole brake housing 1 to be manufactured from the selected material. Thus manufacturing costs can be reduced in two different ways by virtue of the provision of the separate bearing seat members 93.

Figure 14:
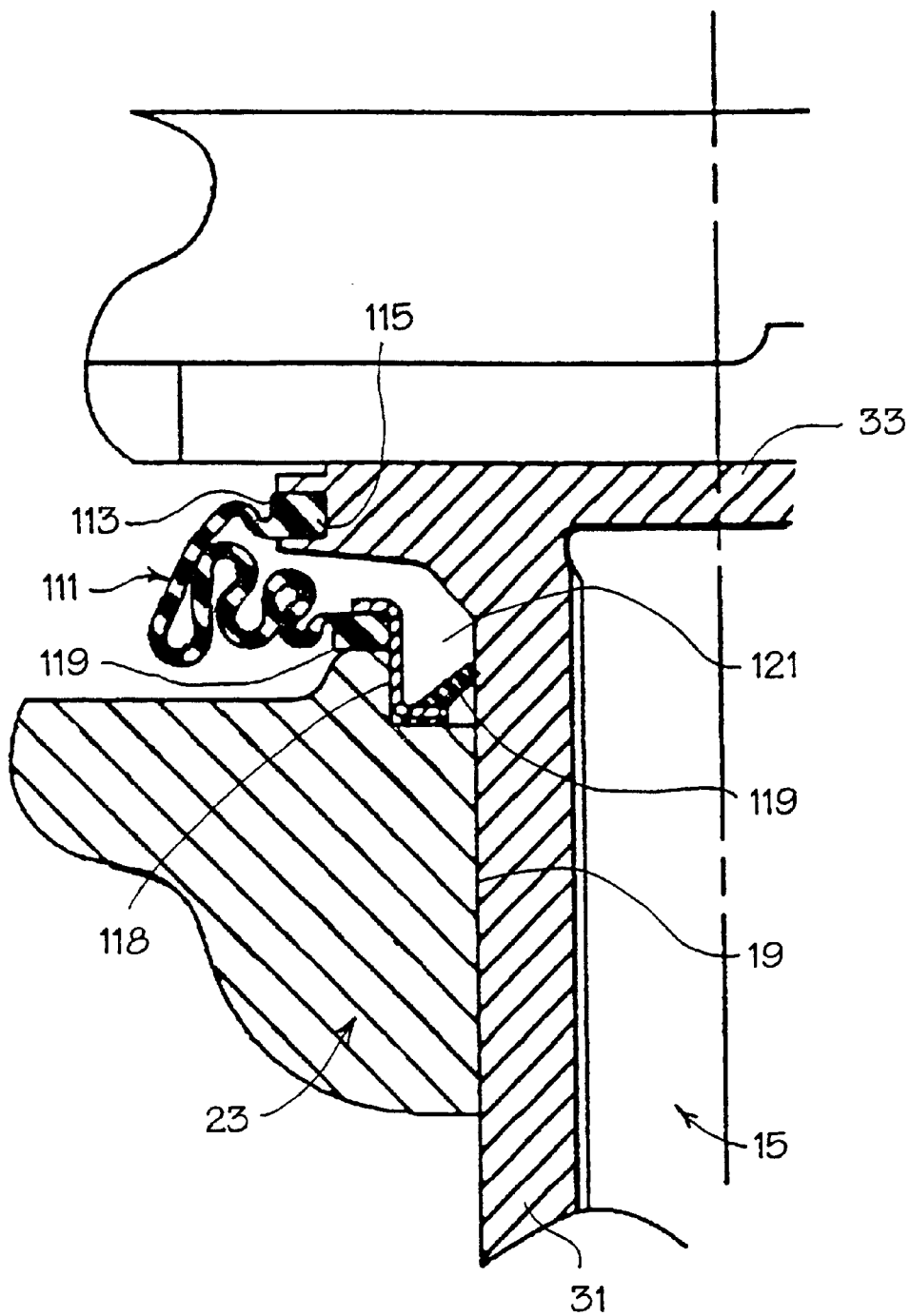
FIG. 14 is a cutaway partial view of any one of the embodiments of FIGS. 1 to 3, illustrating the seal assembly of the present invention, in enlarged detail.

Further, as evident from FIGS. 1, 2 and 14 of the accompanying drawings, a positive and secure seal assembly 110 is provided for each tappet assembly 15, 17. Each such seal assembly 110 comprises an annular flexible boot 111, one end 113 of which is beaded and resiliently and firmly engaged in an annular recess 115 around the head region of the female part 31 of the tappet assembly 15,17. The other end region of the flexible boot 111 is likewise beaded 117 and engages between an upper surface of the cover plate 23 and a parallel surface of an annular retaining member 118 which is of stepped configuration in transverse cross section. A further lip seal 119 is secured eg. bonded, to the inner edge of the retaining member 118 so as to project inwardly thereof. A middle region of this retaining member 118 is generally cylindrical and engages in an enlarged diameter region 121 at the mouth of the bearing aperture 19 in the cover plate 23, through which the tappet 15, 17 passes, the retaining member 118 thus correctly positioning the inwardly directed sealing lip 119 and the flexible boot 111.

With the above sealing assembly 110 construction, assembly is facilitated and manufacturing costs thereby reduced, the annular lip seal 119 is secured eg bonded, coaxially with the annular retaining member 118 which is preferably made of metal. During construction of the brake, the combined lip seal 119 and retaining member 118 are fitted into the enlarged end region 121 of the bearing aperture 19, prior to the tappet 15,17 being inserted in the bearing aperture 19, the retaining member 118 being an interference fit in the enlarged end region 121 of the bearing aperture 19. Then the tappet 15,17 with the flexible boot member 111 secured to the head region 33 of the female part 31 of the tappet 15,17, is inserted through the lip seal 119 and thus the bearing aperture 19, the flexible boot member 111 then being secured between the retaining member 118 and an adjacent surface of the cover plate 23.

In an alternative embodiment (not illustrated) the flexible boot member 111 is also secured eg bonded, to the retaining member 118 so that the boot member 111, lip seal 119 and retaining member 118 form a unitary construction, the sealing assembly 110 can be attached to the female part 31 of a tappet 15,17 assembly with the bead 113 being securely engaged in the annular recess 115 in the head region 33 of the said female part 31, after the retaining member 118 and sealing lip 119 have been slid axially along the outer surface of the said female part 31. Then, the female part 31 of the tappet assembly 15, 17 can be inserted into the bearing aperture 19 together with the seal assembly 110, and the cylindrical portion of the retaining member 118 can be pressed into the enlarged diameter mouth region 121 of the bearing aperture 19, this being an interference fit, to thus positively locate the sealing lip 119 and the flexible boot 111.

The above construction of disc brake has considerable performance advantages together with advantages respect of the ease of assembly ie. reduce manufacturing costs.

What is claimed is:

1. A disc brake assembly comprising:
   a brake housing straddling a braking disc and slidably mounted on a torque taking member, said torque taking member carrying a first and a second friction pad located adjacent opposite faces of said braking disc;
   an adjustable tappet assembly engageable with said first friction pad assembly, said tappet assembly located within a recess in said brake housing, said recess open towards said braking disc;
   a cover plate covering said recess in said brake housing, said cover plate having an bearing aperture with a cylindrical extension such that said tappet is extendable through said bearing aperture.

2. A disc brake as claimed in claim 1, in which said at least one tappet assembly comprises an elongate female part having an axially extending blind bore into which an elongate male part is threadedly engaged.

3. A disc brake as claimed in claim 2, in which the elongate female part has an enlarged diameter head at one end region thereof, this enlarged diameter head engaging, in use, the directly actuated friction pad assembly, the elongate male part likewise having an enlarged head which is, in use, engaged and acted upon by the said eccentric arrangement.

4. A disc brake as claimed in claim 3, in which the enlarged head of the said male part forms a bearing surface which engages a wall of the axially extending projection integrally formed with the cover plate.

5. A disc brake as claimed in claim 4, in which the enlarged head of the said male part has an axially extending lip at its outer edge region, which lip extends towards the threaded end region of the male part and forms a cylindrical inner bearing surface which engages around an outer cylindrical wall region of said axially extending projection integrally formed with the cover plate.

6. A disc brake as claimed in claim 5, in which the axially extending lip and the enlarged head of the male part are of unitary construction.

7. A disc brake as claimed in claim 5, in which the axially extending lip is formed by a hollow cylindrical member secured to the outer surface of the enlarged head region of the male part.

8. A disc brake as claimed in claim 4, in which the free end region of said projection has an enlarged internal diameter section which engages around an outer peripheral bearing surface provided in the enlarged head of said male part.

9. A disc brake as claimed in any one of claims 1, in which the projection integrally formed with the cover plate is formed by a bearing sleeve secured to the cover plate.

10. A disc brake as claimed in claim 9, in which the bearing sleeve is constructed of a different material from the cover plate.

11. A disc brake as claimed in claim 10, in which the bearing sleeve is made of a sintered bearing material and is cast into the cover plate which is itself die cast.

12. A disc brake as claimed in any one of claims 1, in which the projection and cover plate are of unitary construction.

13. A disc brake as claimed in any one of claims 1, in which the bearing aperture in the said projection, has a non-circular transverse cross section into which the said female part with a complimentary outer profile transverse cross section, engages.

14. A disc brake as claimed in claim 13, in which the bearing aperture in the said projection, has a trilobal transverse cross section and the said female part has a complimentary trilobal outer profile transverse cross section.

15. A disc brake as claimed in any one of claims 1, in which there are two tappet assemblies between which an adjuster mechanism is located.

16. A disc brake as claimed in claim 15, in which the adjuster mechanism incorporates a gear wheel which meshes with teeth provided on respective head regions of the respective male parts of said tappet assemblies, whereby rotation of the gear wheel causes rotation of the male parts and resultant axial movement of female parts of said tappet assemblies.

17. A disc brake as claimed in claim 16, in which the adjuster mechanism is operable by gear teeth provided on the lever and eccentric arrangement, which gear teeth engage with said gear wheel with a lost motion mechanism being incorporated to thus only allow said gear wheel to rotate to adjust the tappet assemblies when the lever has been moved through a distance.

18. A disc brake as claimed in any one of claims 15, in which the adjuster mechanism is secured in position on the cover plate, in a further bearing projection integrally formed with the cover plate.

19. A disc brake assembly comprising:
a brake housing straddling a braking disc and slidably mounted on a torque taking member, said torque taking member carrying a first and a second friction pad located adjacent opposite faces of said braking disc;
an actuator mechanism located within a recess in said brake housing, said actuator mechanism operable by a lever and eccentric arrangement; and
a bearing seat member located in a second recesses in said recess of said brake housing, said bearing seat member including a cylindrical bearing surface engageable with said lever and eccentric arrangement.

20. A disc brake as claimed in claim 19, in which each bearing seat member is provided with a retaining projection at one axial end of the part cylindrical bearing surface, this retaining projection extending over an end of a groove provided in the lever and eccentric arrangement to axially retain a force transmitting member which engages a tappet assembly, in said groove.

21. A disc brake as claimed in claim 20, in which each bearing seat member has a tapered base region which is located in said further recess whereby initial installation of the lever and eccentric arrangement correctly aligns the bearing seat members and subsequent brake application deforms the base regions and/or further recesses to secure positive location of the bearing seat members in the brake housing correctly aligned with each other and the lever and eccentric arrangement.

22. A disc brake as claimed in claim 19, in which the bearing seat members are located in said further recesses so as to be freely rotatable therein about an axis perpendicular to the base of each recess.

23. A disc brake as claimed in claim 19, in which the bearing seat members are made of a different material to the brake housing.

24. A disc brake assembly comprising:
a brake housing straddling a braking disc and slidably mounted on a torque taking member, said torque taking member carrying a directly and indirectly actuatable friction pad located adjacent opposite faces of said braking disc;
said brake housing slidable towards and away from said braking disc by an actuator mechanism housed in said brake housing on a first side of said braking disc, said actuator mechanism including a pair of tappets engageable against said directly actuatable friction pad assembly;
said tappets axially slidable towards said braking disc by a lever and eccentric arrangement, one end of said lever having two lateral extensions, each extension forming a cylindrical bearing surface supported on a bearing seat within said brake housing,
said lever having a groove extending transversely between lateral projections, said groove being eccentric relative to said cylindrical bearing surface;
a first and a second force transmitting member located within said groove, each force transmitting member located adjacent an end region of said groove and engagable with one of said tappets;
an intermediate member located in said groove between said first and said second force transmitting member to position said force transmitting members with respect to said tappets; and
a gear drive carried by said intermediate member, said gear drive engagable with an adjuster mechanism to adjust a length of said tappets.

25. A disc brake as claimed in claim 24, in which the groove is of part cylindrical configuration with the force transmission members being cylindrical.

26. A disc brake as claimed in claim 25, in which said intermediate member is cylindrical with a gear drive projecting laterally from the outer surface thereof.

27. A disc brake as claimed in claim 26, in which the intermediate member is rotatable in the groove, with rotation being limited by the gear drive engaging the sides of the groove, this limited rotation providing a lost motion mechanism for an adjuster mechanism of the brake.

28. A disc brake as claimed in claim 26, in which the intermediate member is secured against rotation in the groove.

29. A disc brake as claimed in claim 24, in which the intermediate member is made of a plastics material.

30. A disc brake assembly comprising:

a torque taking member straddling a braking disc;

a brake housing slidably mounted on said torque taking member for movement parallel to an axis of said braking disc;

a brake actuator mechanism located on one side of said braking disc;

at least one tappet assembly which is axially slidable within a bearing aperture of said brake actuator mechanism;

a directly actuated friction pad assembly carried by the torque taking member on one side of the braking disc an indirectly actuatable friction pad assembly carried by the torque taking member on an opposite side of said braking disc;

a seal assembly secured between said brake housing and a head region of said tappet, said seal assembly comprising a flexible annular boot member, one end of said boot member secured in a groove in said head region of said tappet, and an opposite end of said boot member located between a surface of said brake housing adjacent said bearing aperture;

a cylindrical retaining section engaged within an enlarged diameter end region of said bearing aperture; and an annular lip seal secured to said cylindrical retaining section and projecting inwardly of said bearing aperture, said annular lip seal engagable with a shaft of said tappet.

31. A disc brake as claimed in claim 30, in which the annular lip seal is secured to the annular retaining member so as to be coaxial therewith.

32. A disc brake as claimed in claim 31, in which the flexible boot member is secured to the annular retaining member.

33. A disc brake as claimed in claim 31, in which the annular retaining member is an interference fit in the bearing aperture.

* * * * *

UNITED STATES PATENT AND TRADEMARK OFFICE
CERTIFICATE OF CORRECTION

PATENT NO. : 6,354,407 B1
DATED : March 12, 2002
INVENTOR(S) : Heinlein et al.

It is certified that error appears in the above-identified patent and that said Letters Patent is hereby corrected as shown below:

Column 14,
Line 6, "recesses" should be -- recess --

Signed and Sealed this

Tenth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,354,407 B1
DATED : March 12, 2002
INVENTOR(S) : Heinlein et al.

It is certified that error appears in the above-identified patent and that said Letters Patent is hereby corrected as shown below:

Column 13,
Lines 23, 32, 44 and 61, after "in" delete "any one of claims" and insert -- claim --;

Signed and Sealed this

Twenty-sixth Day of November, 2002

Attest:

Attesting Officer

JAMES E. ROGAN
Director of the United States Patent and Trademark Office